(12) United States Patent (10) Patent No.: US 9,067,152 B2
Shurtleff (45) Date of Patent: Jun. 30, 2015

(54) SYSTEMS AND METHODS FOR IMPROVING RATE OF EVAPORATION

(76) Inventor: Kevin Shurtleff, Orem, UT (US)

( * ) Notice: Subject to any disclaimer, the term of this patent is extended or adjusted under 35 U.S.C. 154(b) by 806 days.

(21) Appl. No.: 13/239,128

(22) Filed: Sep. 21, 2011

(65) Prior Publication Data

US 2013/0068397 A1 Mar. 21, 2013

(51) Int. Cl.
*B01D 1/00* (2006.01)
*B01D 17/00* (2006.01)
*B01D 17/02* (2006.01)

(52) U.S. Cl.
CPC ............ *B01D 17/00* (2013.01); *B01D 17/0202* (2013.01); *B01D 17/085* (2013.01)

(58) Field of Classification Search
CPC .......... B01D 1/00; B01D 1/0082; B01D 1/22; B01D 1/222; B01D 3/08

USPC ............ 203/10, 86; 159/602, 9.1, 11.1, 13.1, 159/21; 261/83, 91, 92, 95, 112.1
See application file for complete search history.

(56) References Cited

U.S. PATENT DOCUMENTS

| 4,902,449 | A | * | 2/1990 | Hobbs | 261/94 |
| 5,180,433 | A | * | 1/1993 | Okuda et al. | 118/718 |
| 2003/0057085 | A1 | * | 3/2003 | Azimi | 203/11 |
| 2008/0078670 | A1 | * | 4/2008 | Al-Garni et al. | 202/234 |

* cited by examiner

*Primary Examiner* — Nina Bhat
(74) *Attorney, Agent, or Firm* — David B. Tingey; Bryant J. Keller; Kirton McConkie (57) ABSTRACT

Systems and methods for increasing the rate of evaporation for a liquid. Systems and methods include use of evaporation membranes having large surface areas exposed to the ambient environment.

20 Claims, 8 Drawing Sheets

SYSTEMS AND METHODS FOR IMPROVING RATE OF EVAPORATION

BACKGROUND OF THE INVENTION

1. Field of the Invention

The present invention relates generally to improving evaporation, and more particularly to improving rates of evaporation for water produced during the production stage of an oil well or gas well

2. Background and Related Art

Produced water is water trapped in underground formations that is brought to the surface along with oil or gas during the production state of an oil or gas well. Produced water is by far the largest volume byproduct or waste stream associated with oil and gas production. As part of the process of producing oil and natural gas, operators also must manage large quantities of production water. The quantity of produced water generated each year is substantial and therefore represents a significant component in the cost of producing oil and gas.

When hydrocarbons are produced, they are brought to the surface as a produced fluid mixture. The composition of this produced fluid is dependent upon whether crude oil or natural gas is being produced and generally includes a mixture of either liquid or gaseous hydrocarbons, produced water, dissolved or suspended solids, produced solids such as sand or silt, and injected fluids and additives that may have been placed in the formation as a result of exploration and production activities. Produced water may also include condensed water which includes higher contents of low molecular-weight aromatic hydrocarbons such as benzene, toluene, ethylbenzene, xylene and other volatile organic compounds.

Soluble organics are not easily removed from produced water. Accordingly, the cost for treating or recycling produced water is significant. A viable, yet costly alternative to treating produced water is to safely dispose of the produced water. As produced water is toxic, caution must be taken when disposing of produced water to ensure that the contaminated water does not interfere with vegetation or animal life. Further, caution must be taken to ensure that produced water does not contaminate freshwater wells or aquifers that supply water to humans, animals and/or vegetation.

Thus, it would be an improvement in the art to augment or even replace current techniques with other techniques.

SUMMARY OF THE INVENTION

The present invention relates generally to improving evaporation, and more particularly to improving rates of evaporation for water produced during the production stage of an oil well or gas well.

Some implementations of the present invention provide an evaporation device having an evaporation membrane which is partially disposed in a liquid, wherein the evaporation membrane is cycled through the liquid via a roller or other means for cycling the membrane. In some aspects of the invention, a motor is used to drive a roller that is in contact with a portion of the membrane, wherein the roller rotates or otherwise passes a portion of the membrane through the liquid in a continuous manner.

Some implementations further include a float that monitors the height of a liquid in a reservoir or container of an evaporation system or device. In some aspects of the invention, the float is operably coupled to a flow control valve, wherein the height of the float opens or closes the flow control valve to permit or prevent flow of fluid into the container or onto the membrane.

Some aspects of the present invention provide a disk membrane. Other aspects of the invention provide a tubular membrane. Further still, some aspects of the invention provide a loop or belt membrane.

Some configurations of the present invention utilize a plurality of rollers to move the membrane in a desired path and/or direction. Some membranes of the invention include a support tube or membrane support which defines and maintains an outer shape or circumference of the membrane. Some aspects of the invention further include a retainer or retaining mechanism to maintain a position of the membrane within the evaporation device.

Some implementations of the invention provide a method for increasing the rate of evaporation for a liquid, the method including steps for 1) providing a membrane having a first surface area and a second surface area; 2) providing a container having an opening; 3) positioning a first portion of the membrane in the container via the opening; 4) positioning a second portion of the membrane in an environment that is external to the container; 5) placing a liquid in the container such that the first portion of the membrane is submerged in the liquid; 6) replacing the first portion of the membrane with the second portion of the membrane; and 7) replacing the second portion of the membrane with the first portion of the membrane, wherein the second portion of the membrane is submerged in the liquid. Some methods further include a step for positioning a roller in the container and in contact with the membrane, wherein the roller repositions the first and second portions of the membrane within the container. Methods of the present invention further include a step for providing a plurality of rollers, wherein the plurality of rollers are in contact with the membrane, and wherein at least some of the rollers are positioned within the container.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

BRIEF DESCRIPTION OF THE DRAWINGS

The features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Various embodiments of the present invention may be utilized to assist in evaporating a liquid. For example, some embodiments of the present invention are utilized to evaporate produced water. Other embodiments of the present invention are utilized to evaporate water containing a desired solute, such as sodium chloride or other desired minerals. Further, in some embodiments the present invention is utilized to increase the rate of evaporation over a presently available method or evaporation system.

Some implementations of the present invention comprise a single, stand-alone unit. In other embodiments, a plurality of single, stand-alone evaporation units are interconnected to provide a modular evaporation unit. Thus, some embodiments of the present invention provide a dynamic system of evaporation units, wherein multiple evaporation units may be interconnected to increase the overall rate of evaporation.

Figure 1A:
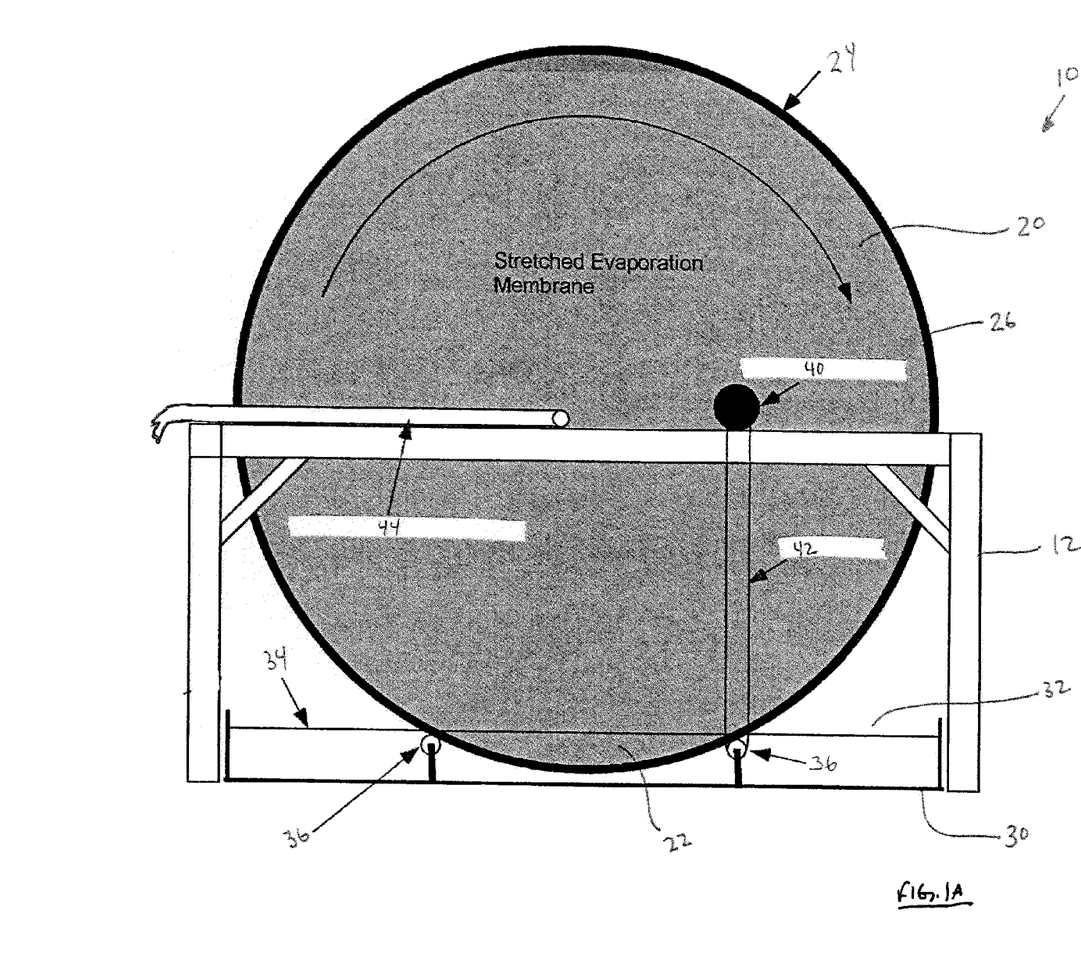
FIG. 1A shows a plan side view of an evaporation device incorporating a disk membrane in accordance with a representative embodiment of the present invention.

Referring now to FIG. 1A, an evaporation device 10 is shown. In general, evaporation device 10 comprises a membrane 20 which is rotationally suspended within a rack or frame 12, wherein a portion 22 of membrane 20 is positioned within a container 30. Container 30 comprises a fluid-tight container having an opening 32 through which portion 22 of membrane 20 is inserted. In some embodiments, container 30 is a collection pool. In other embodiments, container 30 is a fluid reservoir.

Container 30 further comprises a volume which holds liquid 34. In some embodiments, the level of height of liquid 34 in container 30 is configured such that portion 22 of membrane 20 is submerged in liquid 34. In other embodiments, container 30 is merely positioned under membrane 20 so as to catch excess liquid from membrane 20.

Container 30 further includes drive rollers 36. Rollers 36 are positioned such that the rollers support an outer edge 24 of membrane 20. In some embodiments, rollers 36 are positioned within container 30, wherein the placement and height of rollers 36 determines the depth of portion 22 of membrane 20 within container 30. In other embodiments, rollers 36 are positioned external to container 30 (not shown).

Membrane 20 is driven or rotated within container 30 via a motor 40 which is operably connected to at least one roller 36 via a drive belt 42. Motor 40 drives or rotates drive belt 42 which rotates roller 36, thereby rotating membrane 20 at a desired speed. In some embodiments, a desired rotation speed of membrane 20 is selected so as to enable evaporation of liquids trapped or otherwise associated with the portions of membrane 20 external to container 30 before those exposed portions are submerged in liquid 34 of container 30.

In some embodiments, membrane 20 further comprises a membrane support tube 26 which is supported by drive rollers 36. Support tube 26 generally comprises a rigid or semi-rigid material over which membrane 20 is stretched. For example, in some embodiments support tube 26 comprises polyvinylchloride tubing. Support tube 26 maintains a desired shape of membrane 20, thereby enabling rollers 36 to rotate membrane 20 without distorting or otherwise disturbing the shape or function of membrane 20.

In some embodiments, membrane 20 comprises a disk of stretched evaporation membrane or material. For example, in some embodiments membrane 20 comprises a webbing or knit material having interstices which hold liquid 34 via capillary action. In other embodiments, membrane 20 comprises an impermeable material having a hydrophilic coating, wherein liquid 34 is attracted to membrane 20, thereby forming a thin layer of liquid 34 over the surface of membrane 20. Further, in some embodiments membrane 20 comprises a webbing or knit material that is further coated with a hydrophilic coating material.

Frame 12 may include any material, size, and/or shape necessary to maintain the position of membrane 20 within container 30. For example, in some embodiments frame 12 comprises square steel tubing. Frame 12 may further include a motor mount (not shown) for supporting motor 40. In some embodiments, frame 12 further supports a tube 44 which distributes liquid 34 to membrane 20. For example, in some embodiments tube 44 is connected to a fluid pump and a liquid source (not shown) wherein the liquid is pumped through tube 44 onto membrane 20. The distributed fluid is dispersed over membrane 20 by gravity as membrane 20 is rotated via motor 40 and rollers 36. In some embodiments, container 30 further comprises a float (not shown) which is connected to a flow control valve, wherein when the fluid 34 in container 30 reaches a maximum height, the float closes the flow control valve which in turn stops flow of fluid 34 through tube 44. Following evaporation of fluid 34 from membrane 20 and container 30, the fluid height in container 30 decreases thereby opening the flow control valve and resuming flow of fluid through tube 44.

Figure 1B:
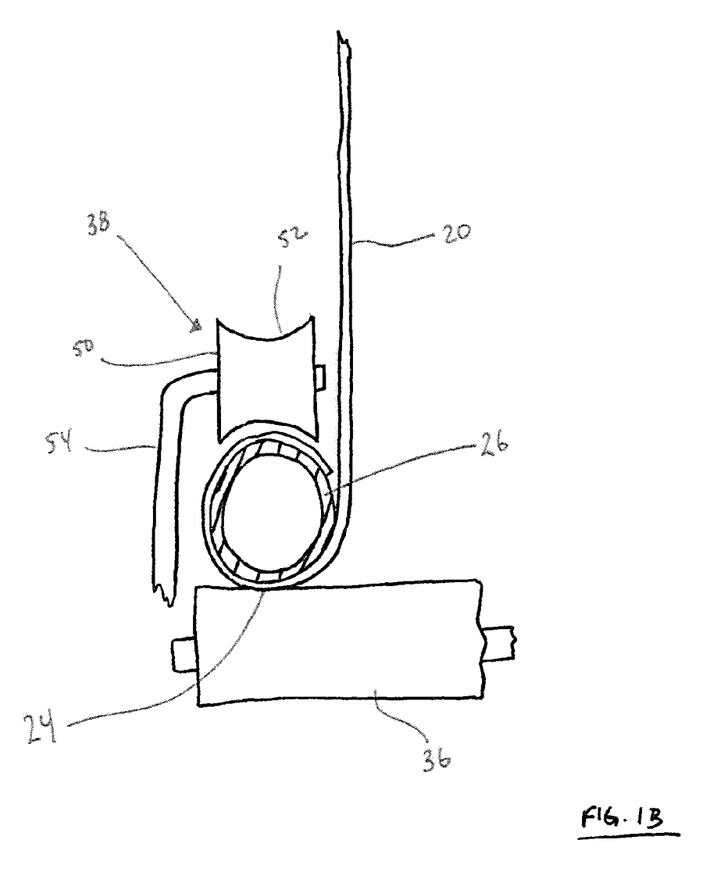
FIG. 1B shows a detailed view of a membrane retaining mechanism of an evaporation device in accordance with a representative embodiment of the present invention.

Referring now to FIG. 1B, a detailed cross-section view of membrane 20 and roller 36 is shown. In some embodiments, device 10 further comprises a retainer 38 for preventing undesirable displacement of membrane 20 from rollers 36. For example, in some embodiments membrane 20 comprises a lightweight material. As such, membrane 20 and support tube 26 are lightweight and may be disturbed or displaced by wind gusts or aberrant weather events. Accordingly, in some embodiments it is desirable to provide means for retaining a desired position of membrane 20 within container 30.

Retainer 38 may comprise any features, size, shape or materials necessary to maintain the position of membrane 20. For example, in some embodiments retainer 38 comprises a roller 50 having a contoured surface 52 for compatibly receiving and retaining an interior surface of support tube 26. Roller 50 further comprises an arm 54 which maintains the desired position of roller 50. In some embodiments, arm 54 is secured to a portion of frame 12. In other embodiments, arm 54 is secured to a portion of container 30.

Figure 2:
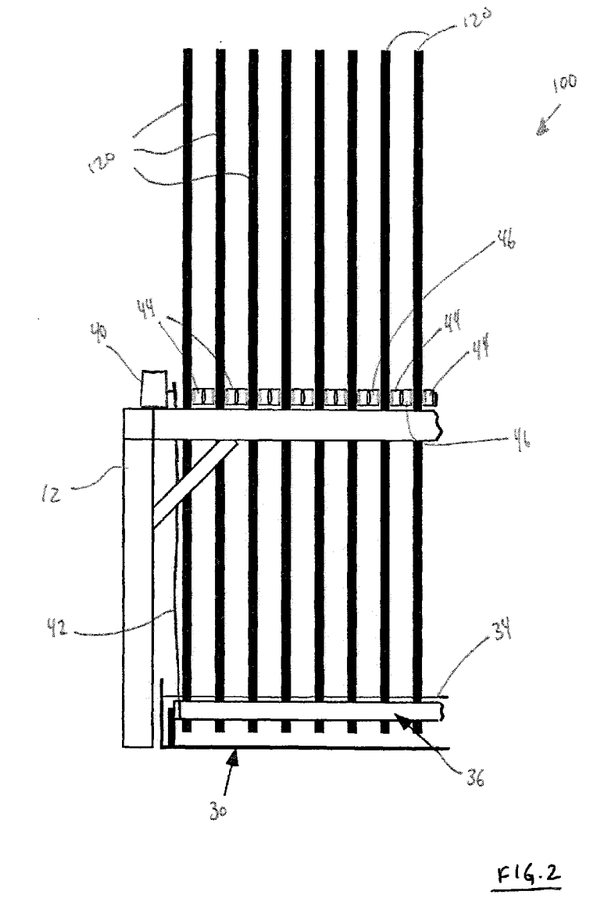
FIG. 2 shows a plan end view of an evaporation device comprising a plurality of membranes in accordance with a representative embodiment of the present invention.

Referring now to FIG. 2, an end view of an evaporation device 100 is shown which incorporates a plurality of parallel evaporation membranes 120. In some embodiments, frame 12, container 30 and rollers 36 are configured to support a plurality of evaporation membranes 120. In general, the dimensions of frame 12, container 30 and rollers 36 are lengthened to provide additional space for membranes 120. As such, a single motor 40 and drive belt 42 are sufficient to rotate the membranes 120 via roller 36.

In some embodiments, additional tubes 44 are provided for each membrane 120 thereby facilitating delivery of liquid 34 to membranes 120. In other embodiments, membrane cleaners 46 are further provided. Membrane cleaners are generally provided to assist in removing accumulated debris and solute from the surface of the membrane 120. In some embodiments, membrane cleaner 46 comprise a scraper that contacts a surface of the membrane to remove accumulated solids and/or residues which result from the evaporation process. In some embodiments, membrane cleaner 46 comprises a flexing pin which contacts membrane 120 to alter the membrane's planar configuration, thereby disrupting adhesion of solids or residues with the membrane 120.

Figure 3:
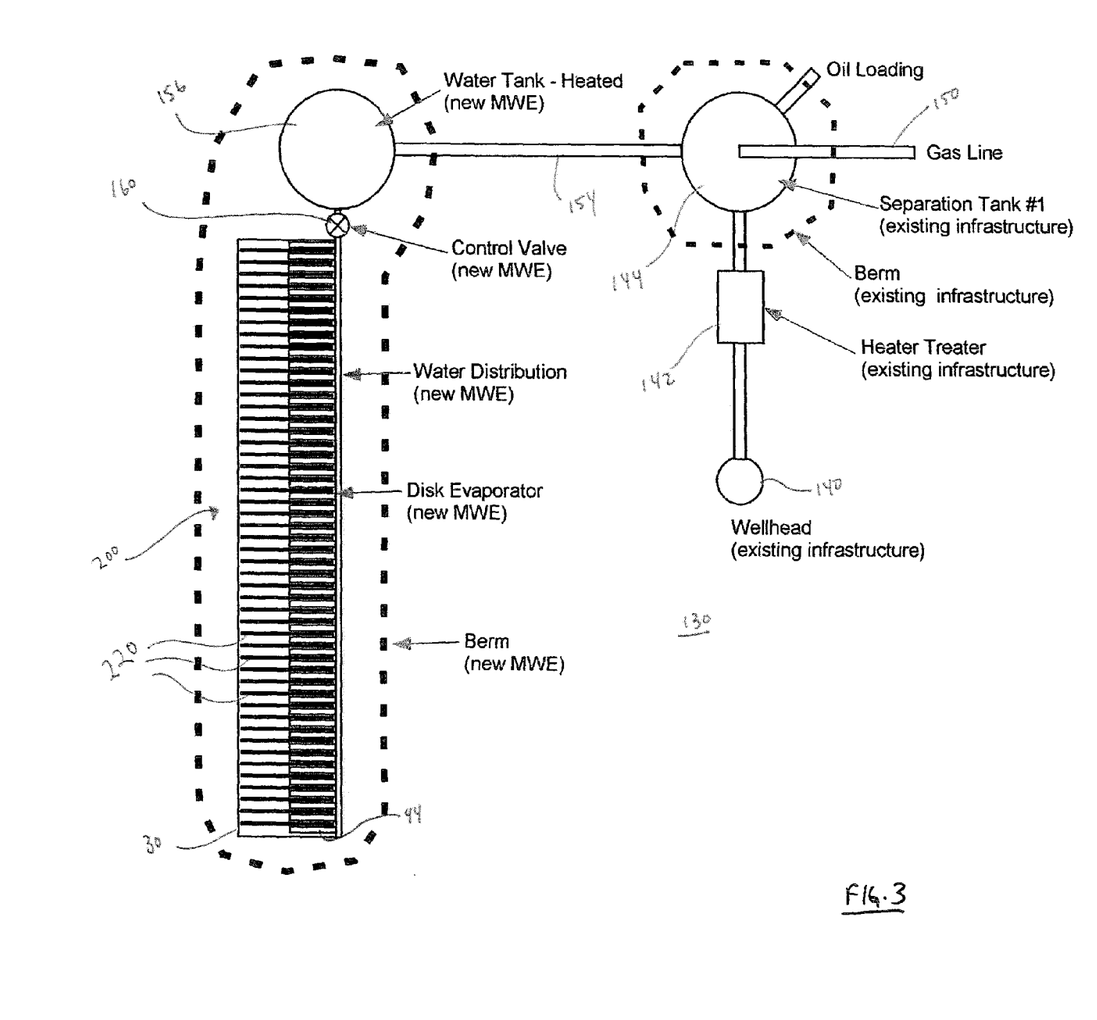
FIG. 3 shows a plan top view of an oil well site and evaporation station in accordance with a representative embodiment of the present invention.

In some embodiments, the devices of the present invention are utilized at an oil well site 130 to facilitate evaporation of produced water in connection with a wellhead 140, as shown in FIG. 3. In general, an oil well site 130 comprises a wellhead 140 and various other well producing machinery, such as a heater unit 142 and a separation tank 144. In some embodiments, materials lifted from the well are heated and then pumped into a separation tank 144, where the various components of the lifted material separate based upon their densities. Volatile components are separated as gases and removed from the separation tank 144 via a gas line 150. Liquid hydrocarbon components, such as oil, are removed from the separation tank 144 via an oil loading spicket 152. The remaining component is produced water which is removed from the separation tank 144 via a water line 154 and stored in a water tank 156.

In some embodiments, produced water within water tank 156 is heated prior to be distributed to evaporation device 200. This process is especially useful when ambient temperatures are below freezing. Where evaporation device 200 is used in freezing or below freezing ambient conditions, some embodiments of the present invention incorporate heating coils and thermal wraps into evaporation device 200. Thus, evaporation device 200 may be utilized year round to dispose of produced water.

A control valve 160 is inserted between water tank 156 and a water supply line 162. Water supply line 162 is further in fluid connection with tubes 44 which distribute produced water directly onto membranes 220 of evaporation device 200. In some embodiments, control valve 160 is further connected to a float in container 30, wherein the float monitors the height of the produced water in container 30. When the height of produced water in container 30 exceeds a desired height, control valve 160 is closed thereby halting flow of produced water to membranes 220 via water supply line 162 and tubes 44, as previously discussed.

As can been seen, the number of membranes 220 may be increased or decreased as needed for a specific application. The rate of evaporation is directly proportional to the surface area of the fluid exposed to the ambient environment. Thus, in some embodiments of the present invention the rate of evaporation is increased by increasing the number of evaporation membranes incorporated into the evaporation device. In other embodiments, the rate of evaporation is increased by increasing the surface area of the evaporation membrane or membranes. Further, in some embodiments a plurality of evaporation units or devices are combined to achieve a desired rate of evaporation. Thus, some embodiments of the present invention provide a modular evaporation system which may be dynamically adjusted based upon the user's needs.

Figure 4:
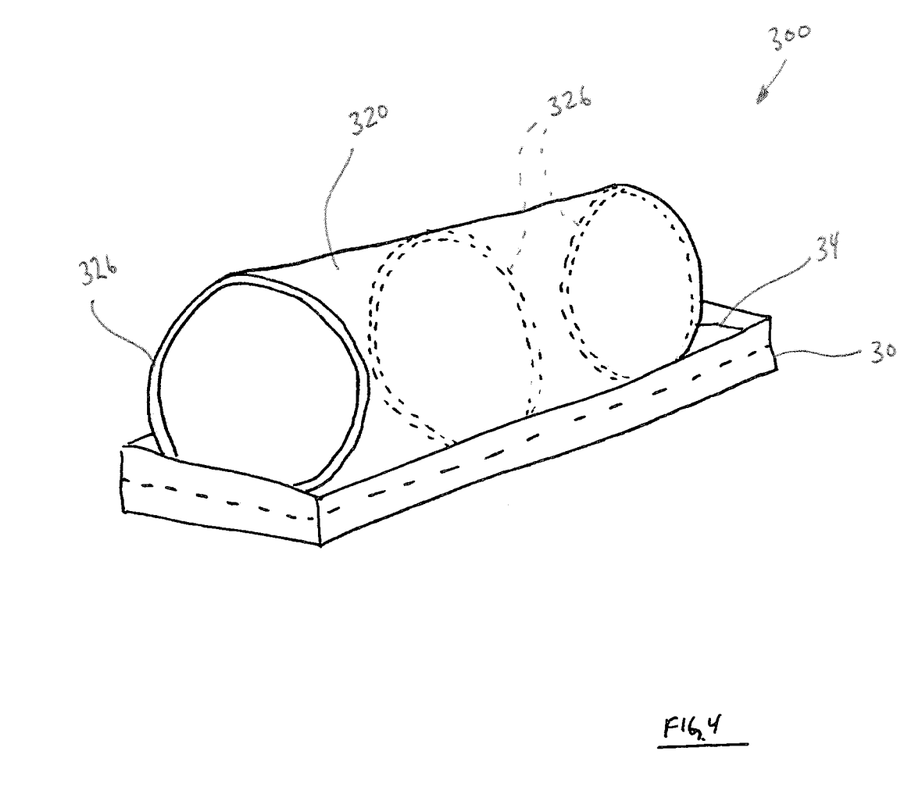
FIG. 4 shows a perspective view of an evaporation device incorporating a tubular membrane in accordance with a representative embodiment of the present invention.

Referring now to FIG. 4, in some embodiments the evaporation membrane comprises a tubular membrane 320 having a plurality of support tubes 326. As with previously discussed embodiments, tubular membrane 320 comprises a portion which is submerged in liquid 34. Tubular membrane is further supported and rotated by rollers 36 (not shown). In this embodiment, the parallel relationship between the planar membrane surface and the liquid 34 ensures complete application of liquid 34 to membrane 320 by merely rotating or passing a portion of membrane 320 through liquid 34 in a continuous manner. As such, distribution of liquid 34 via a delivery tube or water supply line is not needed.

Referring generally to FIGS. 5-8, some embodiments of the present invention provide an evaporation device which utilizes a continuous loop or belt membrane 420. The basic underlying feature of these embodiments is to provide an evaporation device having a configuration wherein a first portion of the belt membrane 420 is routed through (i.e.: submerged in) a reservoir of liquid 34 which is provided in a container 30. A second portion of the belt membrane 420 is routed through the ambient environment. As the belt membrane 420 is run through a series of rollers, the submerged portion of the belt membrane 420 exchanges positions with the portion of the membrane positioned in the ambient environment, thereby facilitating evaporation of the liquid into the ambient environment.

Figure 5:
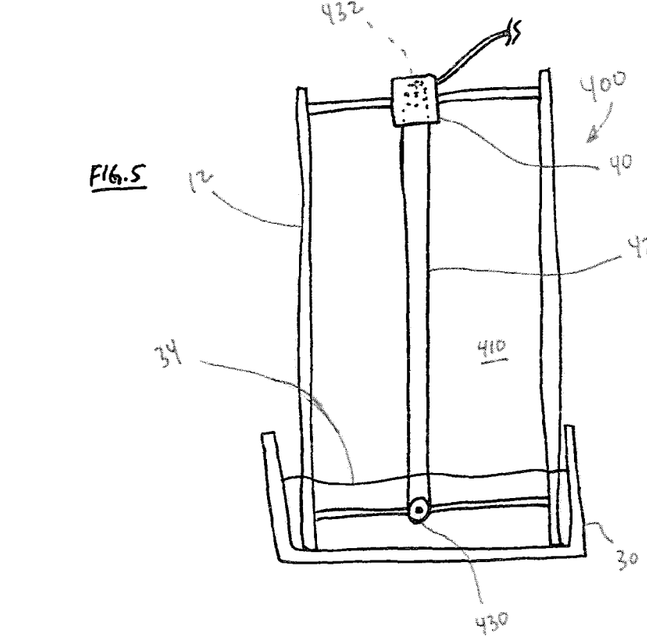
FIG. 5 shows a plan side view of an evaporation device incorporating a belt membrane in accordance with a representative embodiment of the present invention.

Referring now to FIG. 5, an evaporation device 400 is shown. Evaporation device 400 comprises a belt membrane 420 which is suspended between a first roller 430 and a second roller 432, wherein the first roller 430 is submerged in liquid 34, and second roller 432 is driven by motor 40. Upon driving second roller 432, belt membrane 420 runs in a circular path such that portions of belt membrane 420 are cycled between being submerged in liquid 34 and being exposed to ambient environment 410. Evaporation device 400 is further distinguished as rollers 430 and 432 both contact the interior surface of belt membrane 420.

Figure 6:
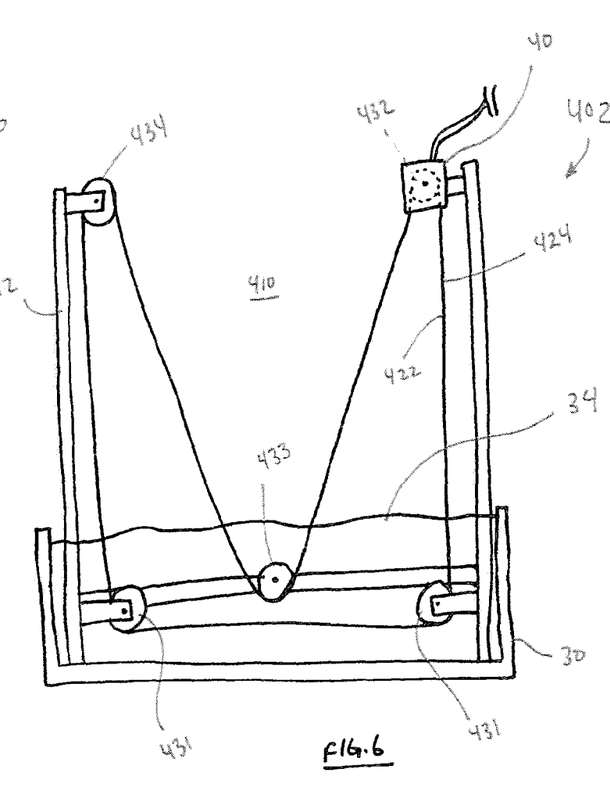
FIG. 6 shows a plan side view of an evaporation device incorporating a belt membrane in accordance with a representative embodiment of the present invention.

Referring now to FIG. 6, an evaporation device 402 is shown. Evaporation device 402 comprises a belt membrane 420 which is suspended between a plurality of submerged rollers 431 and 433, and a plurality of rollers 432 and 434 positioned in the ambient environment 410. This configuration provides a second point at which belt membrane 420 is submerged in liquid 34. Device 402 further provides a configuration wherein rollers 431, 432 and 434 contact an interior surface 422 of belt membrane 420, and roller 433 contacts an exterior surface 424 of membrane 420. Roller 432 is further coupled to motor 40 whereby belt membrane 420 is driven about rollers 431-434.

Figure 7:
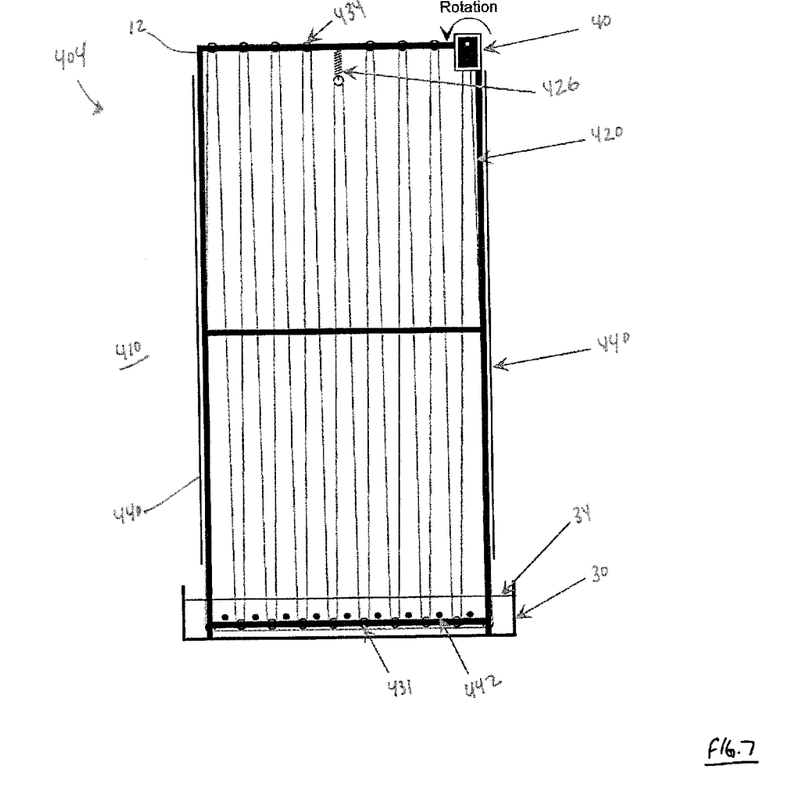
FIG. 7 shows a plan side view of an evaporation device incorporating a belt membrane in accordance with a representative embodiment of the present invention.
Figure 8:
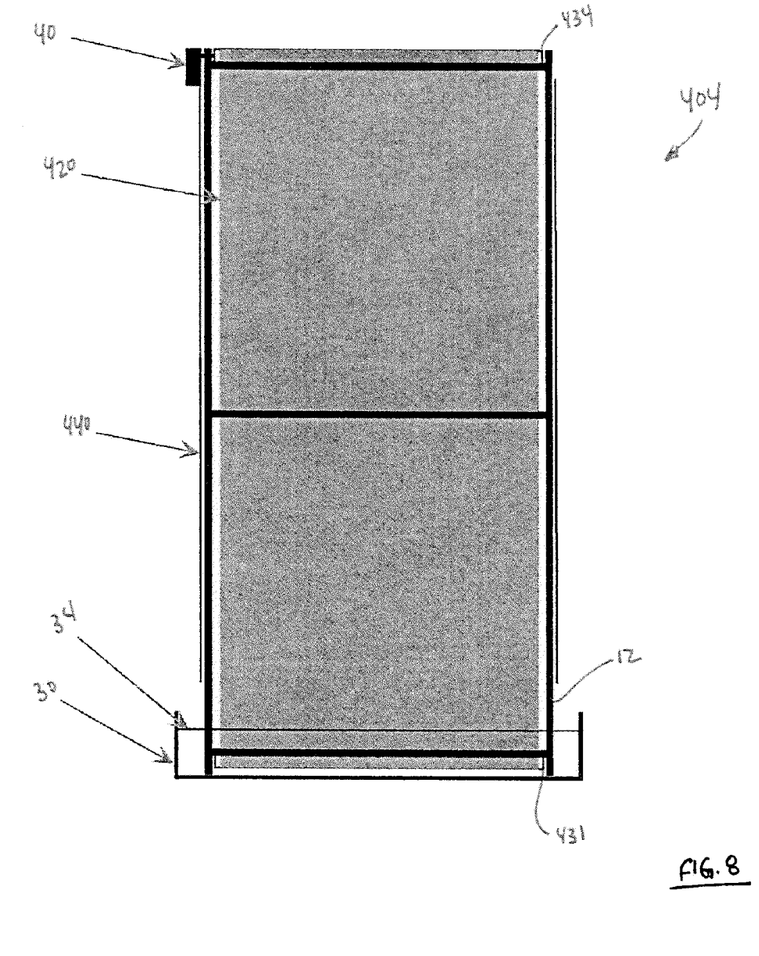
FIG. 8 shows a plan end view of the evaporation device shown in FIG. 7 in accordance with a representative embodiment of the present invention.

Referring now to FIGS. 7 and 8, an evaporation device 404 is shown. Evaporation device 404 comprises an expanded or enlarged version of evaporation device 402. In particular, evaporation device 404 comprises multiple submerged rollers 431 and multiple rollers 434 which are positioned in the ambient environment 410. In some embodiments, device 404 further comprises a tensioning roller 426 which maintains the proper tension of belt membrane 420 about the plurality of various rollers. Device 404 may further include a thermal wrap 440 and heating coils 442 for application of device 404 that are used in cold weather conditions. As demonstrated, the rate of evaporation for device 404 is increased by increasing the surface area of belt membrane 420. Thus, one having skill in the art will appreciate that the present devices 400, 402 and 404 may be dynamically modified and adjusted as needed to achieve a desired rate of evaporation.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. An evaporation device, comprising:
   a container configured to hold an operable amount of a liquid;
   a first membrane having at least one of (a) multiple interstices configured to hold a portion of the liquid via capillary action and (b) a hydrophilic material, wherein the first membrane is movably coupled to the evaporation device such that when the operable amount of the liquid is disposed in the container, a first portion of the first membrane is configured to be disposed below a surface of the operable amount of the liquid in the container and such that a second portion of the first membrane is configured to be disposed above the surface of the liquid in the container and to be exposed to ambient air; and
   a motor that is operably connected to the first membrane such that the motor is configured to rotate the first membrane through the liquid in the container such that the first portion and the second portion of the first membrane are each moved through both the liquid in the container and the ambient air and such that a portion of the liquid in the container is carried by the first membrane above the surface of the liquid in the container to the ambient air such that an evaporable fluid in the portion of the liquid is able to evaporate into the ambient air.

2. The evaporation device of claim 1, further comprising a membrane support comprising at least one of a rigid and a semi-rigid material to which the first membrane is coupled to substantially maintain a shape of the first membrane.

3. The evaporation device of claim 1, further comprising a plurality of rollers, wherein, when the operable amount of the liquid is disposed in the container, at least one of the plurality of rollers is configured to maintain some of the first membrane below the surface of the liquid in the container, while another of the plurality of rollers is configured to maintain some of the first membrane above the surface of the liquid in the container.

4. The evaporation device of claim 1, wherein the evaporation device is further configured to apply the liquid to the first membrane and to allow gravity to pull the liquid into the container.

5. The evaporation device of claim 1, wherein the first membrane is disk-shaped.

6. The evaporation device of claim 1, further comprising a second membrane, wherein the first and the second membranes are arranged in the evaporation device so as to run substantially parallel with each other.

7. The evaporation device of claim 1, further comprising a tensioning roller that is configured maintain the first membrane at a desired tension in the evaporation device.

8. The evaporation device of claim 1, wherein the first membrane comprises a belt and wherein the evaporation device further comprises a first roller in contact with the first portion of the first membrane, a second roller in contact with the second portion, a third roller in contact with the first portion of the first membrane, and a fourth roller in contact with the second portion, wherein the first and third rollers are positioned within the container such that the first and third rollers are configured to be at least partially disposed below the surface of the liquid in the container, while the second and fourth rollers are configured to at least partially disposed above the surface of the liquid in the container when the operable amount of the liquid is disposed in the container.

9. The evaporation device of claim 1, wherein the motor is operably coupled to the first membrane via a drive belt.

10. The evaporation device of claim 1, further comprising a heater configured to provide heat to the liquid in the container that is carried by the first membrane above the surface of the liquid in the container.

11. The evaporation device of claim 1, wherein the first membrane comprises at least one of a knit and a webbing material.

12. The evaporation device of claim 1, further comprising a membrane support, the first membrane being attached to the membrane support to substantially maintain a desired configuration of the membrane, wherein the desired configuration is selected from a disk shape and a tube shape.

13. A method for evaporating a liquid, the method comprising:
   obtaining a membrane having a first surface area and a second surface area;
   obtaining a container having an opening, wherein the container is configured to hold an operable amount of the liquid, and wherein the membrane is movably coupled to the container such that when the operable amount of the liquid is disposed in the container a first portion of the membrane is submerged below a surface of the operable amount of the liquid and the second portion of the membrane is exposed to ambient air above the surface of the operable amount of the liquid;
   placing the operable amount of the liquid in the container such that the first portion of the membrane is submerged below the surface of the operable amount of the liquid and such that the second portion of the membrane is exposed to the ambient air;
   moving the membrane such that the second portion of the membrane is submerged below the surface of the operable amount of the liquid, such that the first portion of the membrane is exposed to the ambient air, and such that the first portion of the membrane carries a portion of the liquid to the ambient air for evaporation.

14. The method of claim 13, further comprising a step for adding an additional amount of the liquid to the container to maintain part of the membrane below, and another part of the membrane above, the surface of the operable amount of the liquid in the container as evaporation occurs at the membrane.

15. The method of claim 13, wherein the membrane comprises at least one of (a) a plurality of interstices configured to hold the liquid via capillary action and (b) a hydrophilic material.

16. The method of claim 13, further comprising a step for using a membrane cleaner to remove debris from the membrane as evaporation occurs.

17. The method of claim 16, further comprising using a heater to heat the liquid to aid in evaporation.

18. The method of claim 13, wherein the membrane comprises at least one of a disk-shaped and a tube-shaped object.

19. A system for evaporating a liquid, the system comprising:
   a membrane having a surface for collecting a liquid, the surface comprising a first portion and a second portion and further comprising at least one of (a) multiple interstices configured to hold a portion of the liquid via capillary action and (b) a hydrophilic material;

a container having a volume configured to hold an operable amount of the liquid such that the first portion of the membrane is configured to be positioned below a surface of the operable amount of the liquid in the container and such that the second portion of the membrane is configured to be positioned outside of the operable amount of the liquid when the operable amount of the liquid is disposed within the container; and a mechanism configured to cycle the membrane through the operable amount of the liquid such that the first portion of the membrane is able to be positioned external to the operable amount of the liquid when the second portion of the membrane is able to be positioned within the operable amount of the liquid, when the operable amount of the liquid is disposed in the container.

20. The system of claim 19, further comprising at least one of a thermal wrap and a heater configured to allow the system to operate in cold temperatures.

* * * * *